US008799047B2

(12) United States Patent
Schimelman

(10) Patent No.: US 8,799,047 B2
(45) Date of Patent: *Aug. 5, 2014

(54) SYSTEM AND METHOD FOR COMPUTERIZED RESOURCE OPTIMIZATION FOR INSURANCE RELATED TASKS

(71) Applicant: Hartford Fire Insurance Company, Hartford, CT (US)

(72) Inventor: Benjamin I. Schimelman, Middletown, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,691

(22) Filed: Jun. 4, 2013

(65) Prior Publication Data
US 2013/0268326 A1    Oct. 10, 2013

Related U.S. Application Data

(63) Continuation of application No. 13/207,644, filed on Aug. 11, 2011, now Pat. No. 8,484,063.

(51) Int. Cl.
*G06Q 10/00* (2012.01)
(52) U.S. Cl.
USPC ....... 705/7.17; 705/7.23; 705/7.39; 705/7.42; 705/4
(58) Field of Classification Search
USPC ........................................ 705/4, 7.11–7.42
See application file for complete search history.

(56) References Cited

U.S. PATENT DOCUMENTS

| 7,870,014 | B2 * | 1/2011 | Baughn et al. | 705/7.14 |
| 7,885,848 | B2 | 2/2011 | Kagan et al. | |
| 8,260,651 | B2 * | 9/2012 | Parthasarathy et al. | 705/7.23 |
| 2003/0187710 | A1 | 10/2003 | Baumer et al. | |
| 2005/0240465 | A1 | 10/2005 | Kiran et al. | |
| 2007/0073430 | A1 | 3/2007 | Govind et al. | |
| 2008/0312885 | A1 | 12/2008 | Chu et al. | |
| 2009/0037242 | A1 | 2/2009 | Ventura et al. | |
| 2009/0204461 | A1 | 8/2009 | Jain et al. | |
| 2010/0223091 | A1 | 9/2010 | Henderson et al. | |
| 2011/0314440 | A1 * | 12/2011 | Singhal et al. | 717/101 |

* cited by examiner

*Primary Examiner* — David Rines
(74) *Attorney, Agent, or Firm* — Volpe and Koenig, P.C.

(57) ABSTRACT

Disclosed herein are computer-implemented methods, computing systems, and related technologies that may be used for determining the optimal number of Full Time Equivalents (FTEs) that should be engaged by a service provider in order to provide a service to an insurance company. Multiple service level agreements (SLAs) exists between the service provider and the insurance company, each of which indicates that the service provider must complete a given percentage of assigned tasks for the service within a given time period. A resource optimization application (ROA) determines how many FTEs the service provider should employ, in order to complete assigned tasks as required by the SLAs. The ROA determines the number of FTEs based on factors such as an average handling time (AHT) for the tasks, the capacity of the service provider, historical data that describes tasks previously assigned to the service provider, and other factors.

20 Claims, 7 Drawing Sheets

SYSTEM AND METHOD FOR COMPUTERIZED RESOURCE OPTIMIZATION FOR INSURANCE RELATED TASKS

CROSS REFERENCE TO RELATED APPLICATIONS

This application is a continuation of U.S. patent application Ser. No. 13/207,644 filed on Aug. 11, 2011, the contents of which are hereby incorporated by reference herein.

BACKGROUND

Insurance companies frequently rely on third-party service providers to assist the insurance companies in performing repeatable business tasks, such as transmitting notifications to claimants, verifying the data included in incoming documents, and matching incoming documents (such as medical bills or other documents) to existing claims. By employing third-party service providers, insurance companies are frequently able to minimize their own infrastructure and labor costs and improve operational efficiency.

When entering into an agreement for service, an insurance company and a service provider may agree on the level of service that that the service provider is expected to provide. As an example, the parties may agree that the service provider will complete 100% of the tasks that are requested of the service provider within two business days. These agreements with respect to service levels are frequently referred to as "Service Level Agreements (SLAs)."

With an SLA in place, other points of negotiation that may exist between an insurance company and a service provider include the fees paid by the insurance company to the provider and how many workers the service provider will need to allocate in order to provide the service at the agreed-upon level. Many service contracts indicate that the fees paid by the insurance company to the service provider is determined based on how many workers (frequently defined in terms of a number of full-time employees or "Full Time Equivalents (FTEs)") the service provider needs to allocate for the service. In such a scenario, both parties are interested in determining the correct number of workers to employ—the insurance company does not want to pay for more workers than are necessary, while the service provider wishes to ensure that they have enough workers to provide the agreed-upon level of service.

While some technologies currently exist that may be used to determine the number of FTEs that should be engaged in order to satisfy SLAs, these technologies could be improved in terms of their ease of use, efficiency, accuracy, flexibility, and other factors. Additionally, current technologies do not adequately address how to allocate workers in the context of complex service agreements, such as service agreements that include multiple SLAs. Therefore, technologies are required that may be used for allocating resources that overcome the above-mentioned issues.

SUMMARY

A system for determining a number of full time equivalents (FTEs) required by a service provider for providing an insurance related service to an insurance company includes a memory device, a processor, and a display device. The service includes the performance of repeatable insurance related tasks, and the memory device is configured to store information that includes: historical insurance related task data that indicates, for each of a plurality of workdays within a time period, a number of insurance related tasks that were assigned to the service provider; service provider capacity information that indicates a number of insurance related tasks that an FTE at the service provider can complete in a single workday; and a first performance goal and a second performance goal. The first performance goal indicates a first turnaround time (TAT) within which a first percentage of insurance related tasks are to be completed, and the second performance goal indicates a second TAT within which a second percentage of insurance related tasks are to be completed. The processor is configured to determine, responsive to the historical insurance related task data, the service provider capacity information, and the first performance goal, a minimum number of FTEs required to meet the first performance goal. The processor is further configured to determine, responsive to the historical insurance related task data, the service provider capacity information, and the second performance goal, a minimum number of FTEs required to meet the second performance goal. The processor is further configured to determine a minimum number of FTEs required to meet the first and second performance goals, wherein the minimum number of FTEs required to meet the first and second performance goals is a weighted sum of the minimum number of FTEs required to meet the first performance goal and the minimum number of FTEs required to meet the second performance goal. The display device is configured to display the minimum number of FTEs required to meet the first and second performance goals.

A computer-implemented method for determining a number of FTEs required by a service provider for providing a service to an insurance company, wherein the service includes the performance of repeatable business tasks, includes a memory device storing information that includes a first performance goal and a second performance goal. The first performance goal indicates a first TAT within which a first percentage of tasks are to be completed, and the second performance goal indicates a second TAT within which a second percentage of tasks are to be completed. The method further includes the a processor determining a minimum number of FTEs required to meet the first performance goal and the processor determining a minimum number of FTEs required to meet the second performance goal. The method further includes the processor determining a minimum number of FTEs required to meet the first and second performance goals, wherein the minimum number of FTEs required to meet the first and second performance goals is a weighted sum of the minimum number of FTEs required to meet the first performance goal and the minimum number of FTEs required to meet the second performance goal. The method further includes the processor displaying, via a display device, the minimum number of FTEs required to meet the first and second performance goals.

A computer-readable medium having processor-executable instructions stored thereon which, when executed by at least one processor, will cause the at least one processor to perform a method for determining a number of full time FTEs required by a service provider for providing a service to a business. The service includes the performance of repeatable business tasks, and the method includes obtaining information that includes a first performance goal and a second performance goal. The first performance goal indicates a first turnaround time (TAT) within which a first percentage of tasks are to be completed, and the second performance goal indicates a second TAT within which a second percentage of tasks are to be completed. The method further includes determining a minimum number of FTEs required to meet the first and second performance goals, wherein the minimum number of FTEs required to meet the first and second performance goals is a weighted sum of: a minimum number of FTEs required to meet the first performance goal; and a minimum number of FTEs required to meet the second performance goal. The method further includes displaying, via a display device, the minimum number of FTEs required to meet the first and second performance goals

BRIEF DESCRIPTION OF THE DRAWINGS

A more detailed understanding may be had from the following description, given by way of example in conjunction with the accompanying drawings wherein.

DETAILED DESCRIPTION

Disclosed herein are computer-implemented methods, computing systems, and related technologies that may be used for determining the number of FTEs that a service provider should engage for providing a service to an insurance company. Multiple SLAs may exist between the service provider and the insurance company, each of which indicates that the service provider must complete a given percentage of assigned tasks for the service within a given time period. A resource optimization application (ROA), described in further detail below, is used to determine the number of the FTEs that a service provider should allocate in order to complete tasks at the service levels required in the SLAs. The ROA determines the number of FTEs based on information such as an average handling time (AHT) for the tasks, the capacity of the service provider, historical task data that describes tasks previously assigned to the service provider, an adjustment factor, and/or other factors.

Figure 1:
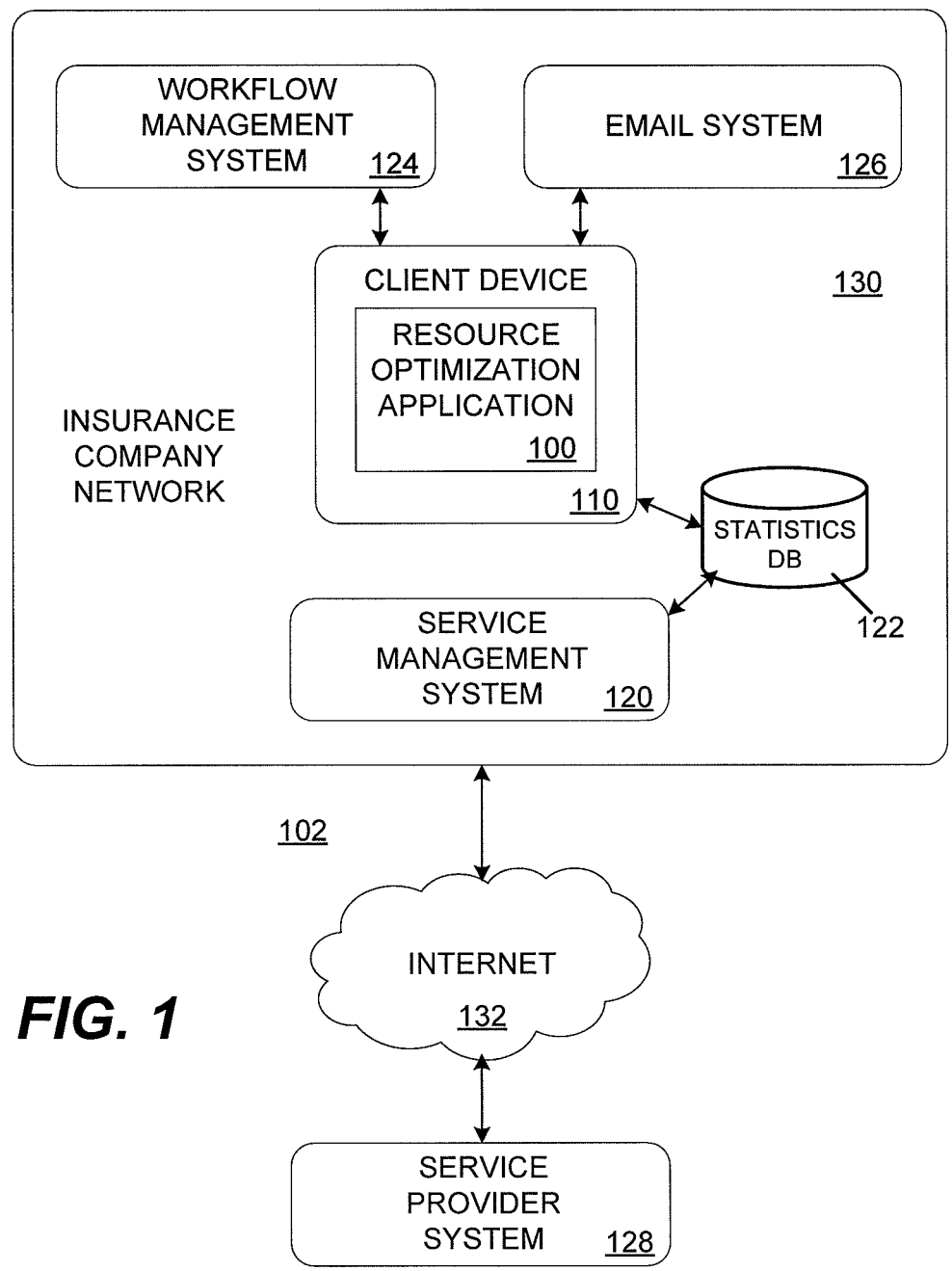
FIG. 1 shows an example architecture that may be used for determining the number of workers that should be allocated for providing a service.

FIG. 1 shows an example architecture 102 that may be used for determining the number of FTEs that should be allocated to a service. The example architecture 102 includes a client device 110, a service management system 120, a service statistics database 122, a workflow management system 124, an email system 126, a service provider system 128, an insurance company network 130, and the Internet 132.

In the architecture 102 of FIG. 1, the insurance company network 130, as well as the components 110, 120, 122, 124, 126 shown in the insurance company network 130, is under the control of and/or operated by employees of an insurance company. The service provider system 128 is under the control of and/or operated by employees of a service provider. As will be described further detail below, a service contract exists between the service provider and the insurance company, and the service provider provides the service to the insurance company pursuant to the service contract via the service provider system 128 and the service management system 120. Also as will be described in further detail below, the number of FTEs that should be allocated for the service may be determined using the ROA 100, which runs on the client device 110. The contract between the service provider and the insurance company specifies that the price paid by the insurance company for the service is based on the number of FTEs engaged by the service provider to provide the service. By using the ROA 100 to determine the number of FTEs that should be allocated for the service by the service provider, the insurance company and the service provider may achieve optimal pricing under the service contract.

The service contract specifies two SLAs that indicate performance goals/requirements that are expected of the service provider. As an example, a first SLA of the two SLAs may indicate that the service provider must complete 90% of assigned tasks within one business day, while a second SLA of the two SLAs may indicate that the service provider must complete 100% of assigned tasks within four business days. According to this example, the first SLA may be referred to as an "expected" level of service—in other words, the insurance company expects to consistently receive at least this level of service from the service provider. Further to this example, the second SLA may be referred to as an "impacted" level of service—in other words, if the level of service provided by the service provider goes below this level, some aspect of the insurance company's business will be negatively impacted.

The service provider system 128 and the service management system 120 may each include one or more computers (not depicted) and/or other data processing devices, one or more databases (not depicted), and/or one or more sub-systems. The computers and/or other data processing devices in the systems 120, 128 may run one or more software applications that are used to manage and process information related to the services provided by the service provider. Using the service management system 120, the insurance company can provide information to the service provider about tasks that the service provider is asked to perform. Using the service provider system 128, the service provider can complete the tasks and provide corresponding information back to the service management system 120. Communication between these systems 120, 128 takes place via the Internet 132 and/or one or more other communication networks.

As one example, the service provided by the service provider to the insurance company may be a workers' compensation correspondence management service. According to this service, when the insurance company receives a new workers' compensation claim, the service management system 120 transmits information to the service provider system 128 that describes the new claim. An employee of the service provider receives this information via the service provider system 128, and then may send initial notification letters, informational packets, and/or other correspondence to the appropriate parties (e.g., the claimant, the insured party, the claimants' attorney, or others) involved in the claim.

Alternatively, the service provided by the service provider may be a personal lines coverage lookup service. According to this service, when the insurance company receives a personal lines claim (related to, e.g., a home insurance, automobile insurance, or other type of personal lines insurance policy), the service management system 120 transmits information to the service provider system 128 that describes the new claim. An employee of the service provider receives this information via the service provider system 128, looks up information that describes the coverage that the claimant had at the time of the loss that gave rise to the claim, verifies the accuracy of this information, and transmits the information back to the service provider system 128.

Alternatively, the service provided by the service provider may be a workers' compensation claims matching service. According to the claims matching service, the insurance company may receive a document (such as a bill submitted by a medical provider) related to a current workers' compensation claim. Depending upon the format of the document and the information included in the document, the insurance company may or may not be able to automatically match the document to the correct claim for processing. If the insurance company cannot match the document to a claim, the service management system 120 transmits information to the service provider system 128 related to the document. An employee of the service provider then searches to find the claim that matches the document, and sends information that identifies the correct claim back to the service management system 120.

Alternatively, the service provided by the service provider may be a payment processing service. The insurance company may receive an invoice for goods or services rendered (such as, for example, a service provided by an outside vendor to the insurance company to assist in the claims appraisal process), and may enter the invoice in the service management system 120. An employee of the service provider may receive the invoice via the service provider system 128, and then analyze the invoice in view of guidelines for invoices provided by the insurance company. If the employee determines that the invoice is appropriate (i.e., contains no errors or discrepancies) and has not been paid, the employee can send information to the service management system 120 via the service provider system 128 that indicates that the invoice should be paid. Alternatively, if the employee determines that the invoice should not be paid, the employee can send information to the service management system 120 that indicates that the invoice should be further processed by the insurance company.

As the service provider provides the service to the insurance company, the service management system 120 stores historical information about the tasks performed according to the service in the service statistics database 122. The service statistics database 122 may be spread across one or more computer-readable media, and may be or include one or more relational databases, hierarchical databases, object-oriented databases, one or more flat files, one or more spreadsheets, and/or one or more structured files. The service statistics database 122 may be managed by one or more database management systems (not depicted), which may be based on technologies such as Microsoft SQL Server, MySQL, PostgreSQL, Oracle Relational Database Management System (RDBMS), a NoSQL database technology, and/or any other appropriate technologies. Statistics that are stored by the service management system 120 in the service statistics database 122 may indicate information such as: the number of tasks that were assigned to the service provider on a number of dates for a given service; the dates and times the tasks were completed; the number of tasks that were performed; the services to which the tasks relate; turnaround times (TATs) for the tasks (i.e., the amounts of time taken between the submission of a task for performance and completion of the task by the service provider); and/or other information.

As mentioned above, the number of FTEs that should be allocated for the service can be determined using the ROA 100. To determine the number of FTEs that should be allocated to the service, the ROA 100 generates a model that describes whether the service provider, given different numbers of FTEs and a model of an incoming flow of tasks, is able to complete the tasks as required by the goals specified in the contract. Using this model, the ROA 100 determines the minimum number of FTEs that are required, given the model of the incoming flow of tasks, to meet to the goals specified in the contract.

This model may also be based on a number of other parameters, such as the time required by an FTE to complete a task, an adjustment factor, and other factors. An adjustment factor may be used by the ROA 100 to modify the historical task information. As an example, if an adjustment factor has a value of 10% and the historical task information indicates that 100 tasks were assigned on a given day, the ROA 100 may use these parameters to generate adjusted historical task information based on the historical task information that indicates that 110 tasks (i.e., a 10% higher value) were assigned on that day. By using this adjustment factor, the ROA 100 may model variations in FTE requirements versus the number of FTEs that were required in the past for the service.

Further details regarding the processing that the ROA 100 may perform to determine the number of FTEs that should be allocated for the service are described below with reference to, inter alia, FIGS. 2-3. Additionally, the ROA 100 may include a graphical user interface, via which users may provide input data to the ROA 100 and view data generated by the ROA 100. Examples of how the graphical user interface of the ROA 100 may be implemented are described below with reference to, inter alia, FIGS. 4-5.

The ROA 100 may be a processor-executable software application and may be or include, by way of example, one or more executable programs, one or more functions, one or more method calls, one or more procedures, one or more routines or sub-routines, one or more processor-executable instructions, and/or one or more objects or other data structures. Alternatively or additionally, the ROA 100 may be implemented using a spreadsheet application and one or more macros. Spreadsheet applications used for this purpose include, for example, Microsoft Excel, OpenOffice Calc, or any other appropriate spreadsheet application.

For convenience in description, the ROA 100 is described herein as performing a number of actions. However, it should be understood that the actions described herein as performed by the ROA 100 are performed by the one or more processors in the client device 110, in conjunction with the above-mentioned other components (i.e., the data storage devices, memory devices, input devices, and/or display devices, as appropriate) that are included in or connected to the client device 110.

Also as mentioned above, the ROA 100 runs on the client device 110. The client device 110 may be a desktop computer, a laptop computer, a tablet computer, or any other appropriate type of computing device or data processing device. The client device 110 includes one or more processors (not depicted), and may include one or more storage devices (not depicted), one or more memory devices (not depicted), and/or one or more computer-readable media (not depicted). The client device 110 may also include and/or be connected to one or more input devices (not depicted) and/or one or more display devices (not depicted). The ROA 100 (as well as the data described herein as used and/or processed by the ROA 100) may be stored in the client device data storage devices, memory devices, and/or computer-readable media in the client device 110.

The workflow management system 124 is a system that implements functionality related to business process management, workflow management, and/or related functionality. The workflow management system 124 may be a system such as, for example, a Microsoft Windows Workflow Foundation system, a Microsoft BizTalk system, an IBM Business Process Management (BPM) system, or any other appropriate system. The email system 126 is a system for the communication of email messages and may include an email server such as a Microsoft Exchange Server, Eudora Internet Mail Server, or other server. These systems 124, 126 may each include one or more computers (not depicted) and/or other data processing devices, one or more databases (not depicted), and/or one or more sub-systems. The computers and/or other data processing devices in the systems 120, 128 may run one or more software applications for implementing the features described herein as performed by these systems 120, 128.

After the ROA 100 has performed analysis related to determining the number of FTEs that should be allocated by the service provider, the ROA 100 may interact with the workflow management system 124 and/or the email system 126. For example, when the ROA 100 determines a number of FTEs that should be allocated to a service, the ROA 100 may send one or more messages to the workflow management system 124 that indicate that an employee of the insurance company should perform a task based on the determined number of FTEs, such as entering into a negotiation with the service provider to change the number of FTEs to the determined number. Management of this task may subsequently be performed using the workflow management system 124. Alternatively or additionally, when the ROA 100 has determined a number of FTEs, the ROA 100 may, via one or more messages exchanged with the email system 126, send an email message that includes information that indicates the determined number of FTEs and related information.

The communications described herein as taking place between the ROA 100, workflow management system 124, email system 126, client device 110, service statistics database 122, and service management system 120 are performed via the insurance company network 130. Although described for convenience as a single network, the insurance company network 130 may be or include one or more private wired or wireless networks that are under the control of and/or operated by the insurance company. The one or more private wired or wireless networks may be based on, for example, technologies such as Ethernet, Institute of Electrical and Electronics Engineer (IEEE) 802.11 technologies, and/or other technologies.

Although the example architecture 102 of FIG. 1 shows a particular network topology, any appropriate arrangement of the components 110, 120, 122, 124, 126, 128 shown in FIG. 1 may be used.

Figure 2:
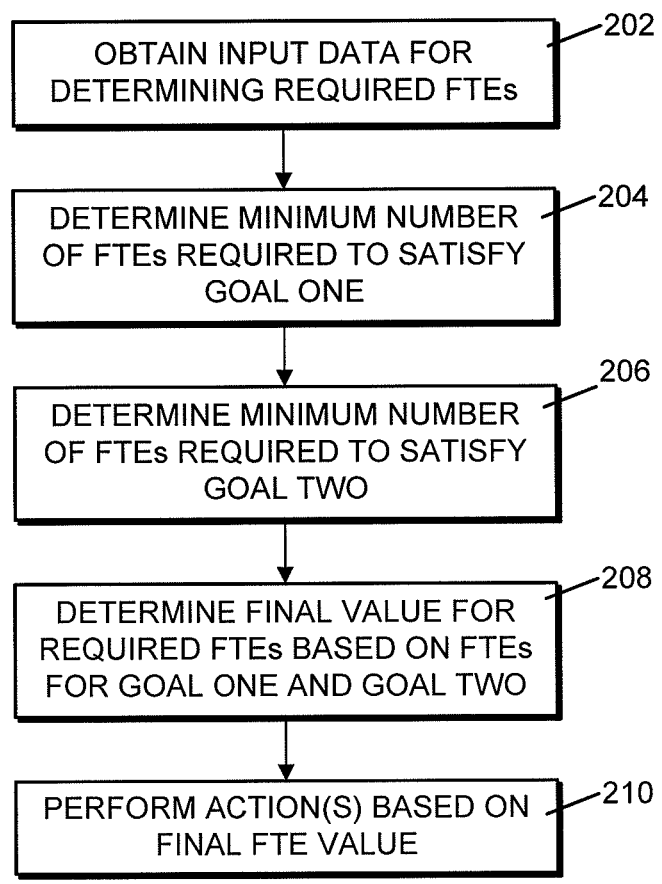
FIG. 2 shows an example method for determining the number of workers that should be allocated for providing a service.

FIG. 2 shows an example method 200 for determining a number of FTEs required for a service that may be performed using the ROA 100 of FIG. 1.

The method 200 of FIG. 2 begins at step 202 with the ROA 100 obtaining input data. This input data includes, for example, information that describes one or more of the following: historical task information that describes, for each of the workdays within a given time period, the number of tasks that were assigned to the service provider; service provider information that describes the capacity of the service provider to complete the tasks involved in the service (i.e., an indicator of task capacity per FTE per workday); information that describes an average for how long each task involved in the service takes to perform (i.e., an "Average Handling Time (AHT)"); and/or other information.

The input information also includes an adjustment factor, which may be used by the ROA 100 to modify the historical task information. As an example, if an adjustment factor has a value of 10% and the historical task information indicates that 100 tasks were assigned on a given day, the ROA 100 may use these parameters to generate adjusted historical task information that indicates that 110 tasks (i.e., a 10% higher value) were assigned on that day. By including an adjustment factor in the input data, the ROA 100 may model variations in FTE requirements versus the number of FTEs that were required in the past for the service. For example, the historical task information may include data for winter months, but a user of the ROA 100 may want to predict the required number of FTEs for upcoming summer months during which an increase in task volume is expected. To do so, an appropriate adjustment factor can be included in the input data, so that the ROA 100 will determine the correct number of FTEs that will be needed with the expected increase. Additionally, the adjustment factor may have a value of zero, in which case the modified historical task information will have the same values as the values in the original historical task information.

The input information also includes information that describes two goals for task performance, wherein each goal is defined as including a completion percentage and a turn-around time (TAT). As an example, the first goal might require a 90% completion of tasks with a one-day TAT (i.e., that the service provider should complete 90% of assigned tasks within one business day of their assignment), and the second goal might require a 100% completion of tasks with a four-day TAT (i.e., that the service provider should complete 100% of assigned tasks within four business days of their assignment).

Some or all of the input information may be obtained by the ROA 100 from the service statistics database 122, and/or from reading in the information from one or more configuration files. Alternatively or additionally, in an instance where the ROA 100 includes a graphical user interface, the ROA 100 may obtain some or all of the input information via the graphical user interface.

Next, at step 204, the ROA 100 determines the minimum number of FTEs that are required in order to meet the first goal, based on the input data. This step includes the ROA 100 determining adjusted historical task information based on the adjustment factor and the historical task information included in the input information. To determine the minimum number of FTEs that are required to meet the first goal, the ROA 100 analyzes the volume of tasks in the adjusted historical task information and the capacity of the service provider to complete the tasks, and calculates from these parameters the minimum number of FTEs that would be necessary to meet the first goal (i.e., to complete the given percentage of assigned tasks within the given TAT).

Then, in step 206, the ROA 100 performs analogous processing to that described above with respect to step 204 to determine the minimum number of FTEs that are required to meet the second goal.

Further details regarding how steps 202 and 204 may be performed are provided below with reference to FIG. 3.

Then, at step 208, the ROA 100 determines a final number of FTEs that are required to meet both goals. The ROA 100 may determine the final number of FTEs that are required to meet both goals as a weighted sum of the minimum number of FTEs required to meet the first goal (as determined in step 202) and the minimum number of FTEs that are required to meet the second goal (as determined in step 204). The minimum number of FTEs may be weighted based on a number of different factors, such as the completion percentage as defined according to the first goal and/or the completion percentage as defined according to the second goal.

Formula 1, included below, shows one example of how the final number of FTEs may be determined as a weighted sum of the minimum number of FTEs required to meet the first goal and the minimum number of FTEs that are required to meet the second goal.

$$\text{FINAL\_FTEs} = (G1\% \times G1\_\text{FTEs}) + ((1 - G1\%) \times G2\_\text{FTEs}) \quad \text{[FORMULA 1]}$$

The variables in Formula 1 have the following meanings: FINAL_FTEs is the final number of FTEs that are required to meet both goals; G1% is the completion percentage as defined according to the first goal; G1_FTEs is the minimum number of FTEs required to meet the first goal; and G2_FTEs is the minimum number of FTEs required to meet the second goal.

After the final number of FTEs that are required to meet both goals is determined, one or more actions based on the final FTE value are performed (step 210). The one or more actions may include the ROA 100 displaying the final FTE value on a display device, storing the FTE value in a memory device or computer-readable medium, and/or transmitting the FTE value via a communications network. Alternatively or additionally, the ROA 100 may generate a report document that includes the FTE value. The ROA 100 may then exchange one or more messages with the email system 126 to send an email message that includes the report as an attachment. Alternatively or additionally, the ROA 100 may print the report document via a printer that is connected to the client device 110.

Alternatively or additionally, the one or more actions may include a user of the ROA 100 application viewing the FTE value, and then contacting an employee of the service provider organization via phone, fax, or in an in-person meeting, to discuss modifying the number of FTEs allocated by the service provider to the service. Alternatively or additionally, the one or more actions may include the ROA 100 sending one or more messages to the workflow management system 124 that indicate that a task should be performed based on the determined number of FTEs. The task may require, for example, that an insurance company employee should enter into a negotiation with the service provider to change the number of FTEs allocated to the service to the determined final FTE value. When presented with the number of FTEs determined by the ROA 100, the service provider may modify the current number of FTEs allocated to the service and/or may agree to the number of FTEs that will be allocated during a future service period, thereby changing the cost of the service to the insurance company.

Figure 3:
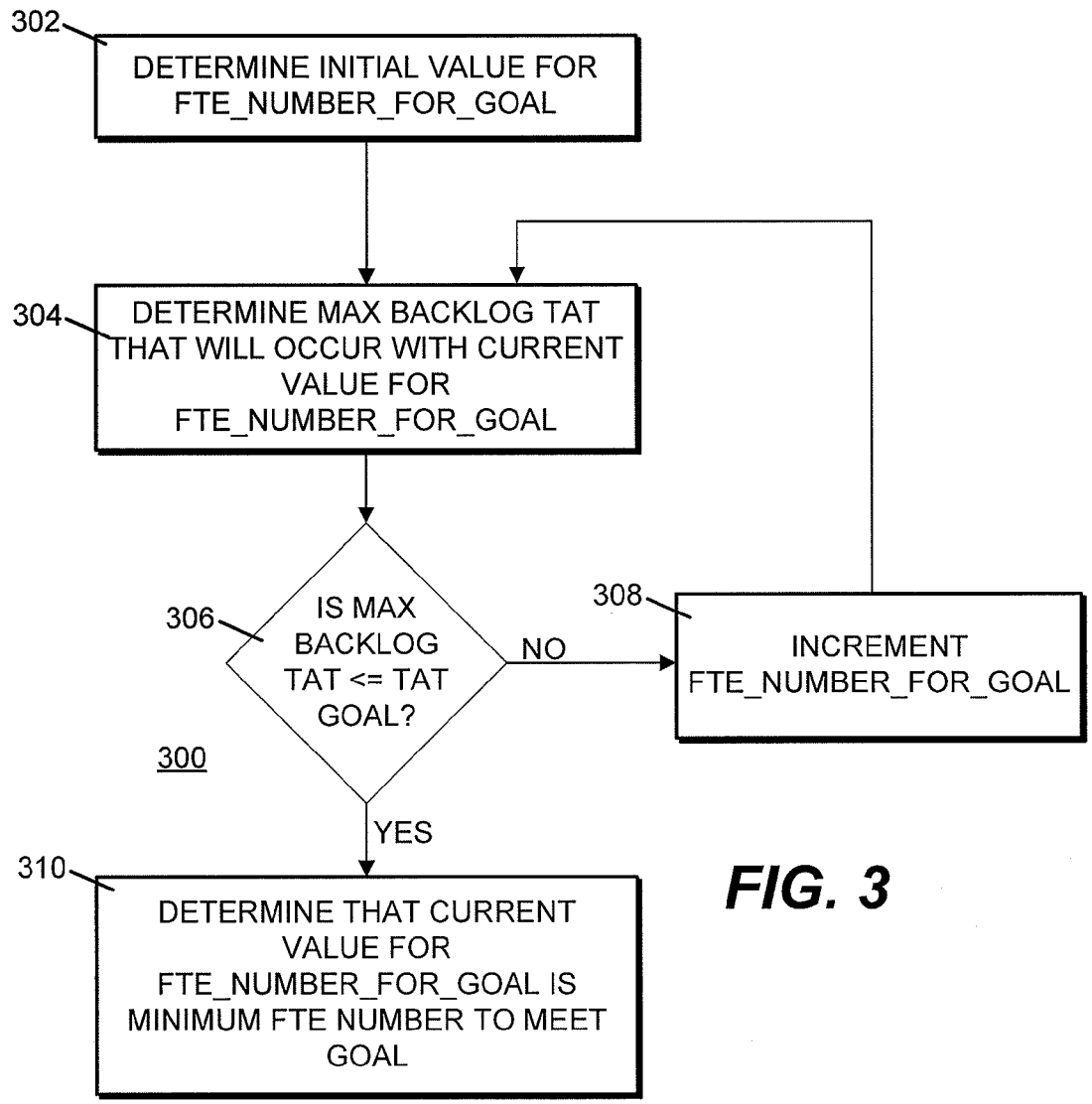
FIG. 3 shows an example method for determining, for a given goal, the minimum number of workers that are necessary to meet the goal.

As mentioned above, further details regarding how steps 202 and 204 of FIG. 2 may be performed are shown in FIG. 3. FIG. 3 shows an example method 300 for determining, for a given goal, the minimum number of FTEs that are necessary to meet the goal. When performing the method 200 of FIG. 2, the ROA 100 performs the method of FIG. 3 twice—once as step 202 of FIG. 2 for the first goal and the second time as step 204 of FIG. 2 for the second goal.

To perform the method 300 of FIG. 3, the ROA 100 uses a parameter (referred to herein and in FIG. 3 as "FTE_NUMBER_FOR_GOAL") that indicates a number of the FTEs that are deployed at the service provider for performing tasks to meet the goal. Using this parameter (as well as other parameters), the ROA 100 models a number of aspects of the service provider, including the capacity of the service provider to complete tasks. Additionally, performing the method 300 of FIG. 3 includes the ROA 100 modeling a backlog (i.e., a queue of tasks that are assigned to the service provider but are not yet completed) that may accumulate during the given time period. Further, while performing the method 300 of FIG. 3, the ROA 100 models a backlog TAT (i.e., the amount of time that it would take for the service provider to complete the tasks in the backlog at a particular date given the value for FTE_NUMBER_FOR_GOAL) for each of the days in the given time period.

The method 300 of FIG. 3 begins with the ROA 100 determining an initial value for the FTE_NUMBER_FOR_GOAL parameter (step 302). The initial value for FTE_NUMBER_FOR_GOAL may be a small value (e.g. 0.01) that would be expected to be less than the number of FTEs that would be necessary to meet most goals.

Then, the ROA 100 determines the maximum backlog TAT that will occur for the goal with the current value for FTE_NUMBER_FOR_GOAL (step 304). Here, the ROA 100 also keeps track of the number of tasks in the backlog during the period specified in the historical task information, based on the speed at which the service provider can complete tasks with the number of FTEs indicated in FTE_NUMBER_FOR_GOAL and the assigned tasks that are indicated as being assigned in the historical task information. More specifically, for each day in the specified period, the ROA 100 determines the number of tasks in the backlog based on the number of incoming assigned tasks for the given day, the speed at which the service provider can complete tasks with the number of FTEs indicated in FTE_NUMBER_FOR_GOAL, and the number of tasks in the pre-existing backlog based on calculations from previous days. In this manner, the ROA 100 generates information that indicates the number of tasks in the backlog for each date in the specified period. Based on the number of tasks for each date in the specified period, the ROA 100 then determines a backlog TAT for each date (i.e., the amount of time that it would take for the service provider to complete the tasks in the backlog at that particular date). Then, the ROA 100 determines that the highest of the backlog TATs is the maximum backlog TAT.

Next, at step 308, the ROA 100 compares the determined maximum backlog TAT to the TAT specified in the goal. In an instance where the maximum backlog TAT is greater than the TAT specified in the goal, the ROA 100 proceeds to step 310, wherein it is determined that the current value for FTE_NUMBER_FOR_GOAL is the minimum number of FTEs that are necessary to meet the goal. On the other hand, in an instance where the maximum backlog TAT is greater than the TAT specified in the goal, the ROA 100 proceeds to step 308, wherein the value for FTE_NUMBER_FOR_GOAL is incremented. The value for FTE_NUMBER_FOR_GOAL may be incremented by a small value such as 0.01, or any other appropriate value. The ROA 100 then performs steps 304, 306, and 308 again as many times as necessary (incrementing FTE_NUMBER_FOR_GOAL with each performance of step 308) until the method 300 of FIG. 3 concludes at step 310.

Figure 4:
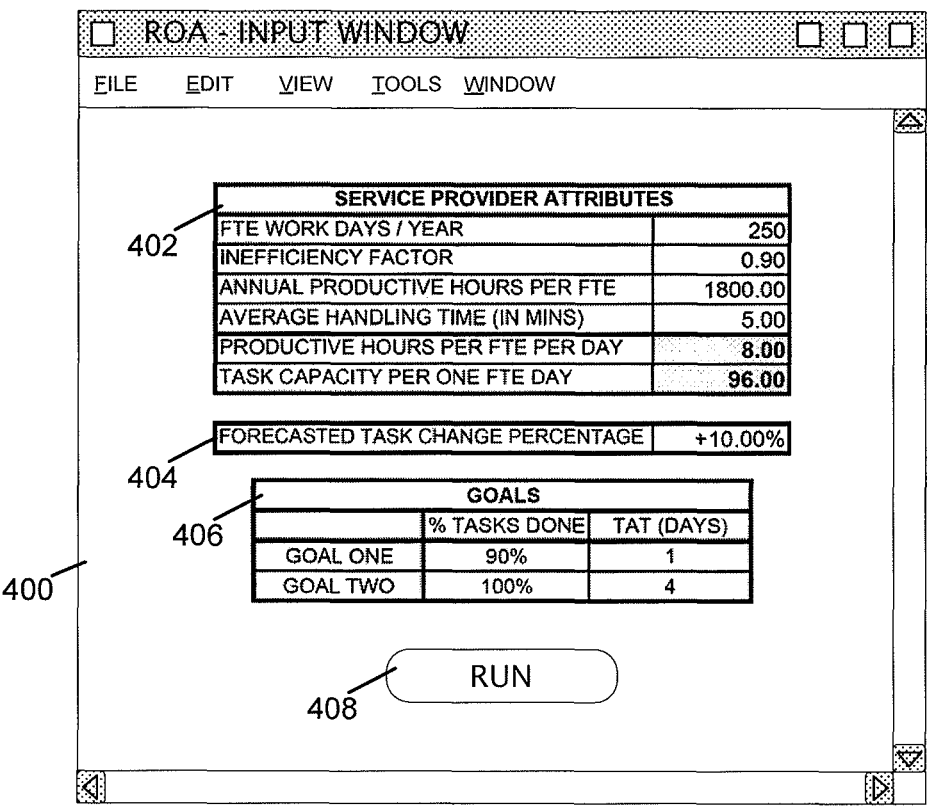
FIG. 4 shows an example user interface window for receiving user input to determine the number of workers that should be allocated for providing a service.
Figure 5:
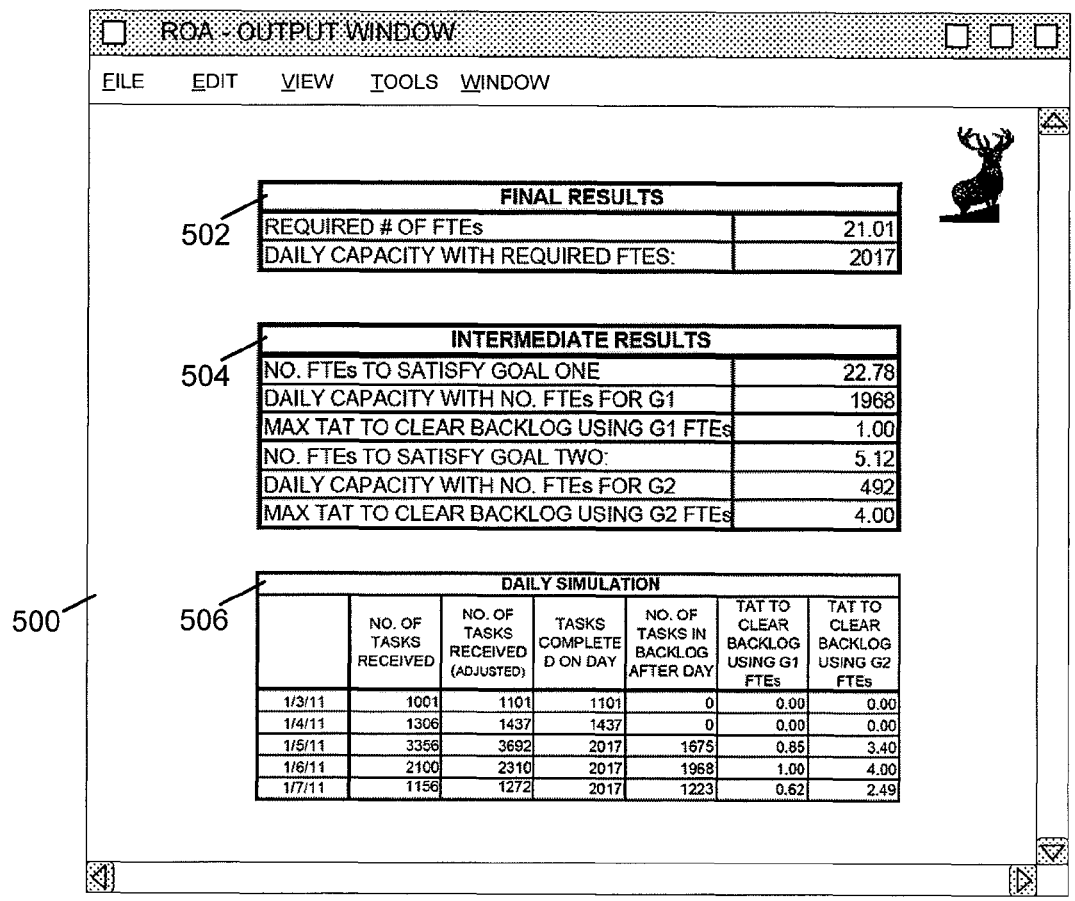
FIG. 5 shows an example user interface window for displaying the results of a determination of the number of workers that should be allocated for providing a service.

As mentioned above with reference to FIG. 1, the ROA 100 may include graphical a user interface. FIGS. 4 and 5 show example windows 400, 500 that may be displayed by the ROA 100 as part of this graphical user interface. The window 400 of FIG. 4, as will be described in further detail below, includes a number of fields that may be used to provide user input data the ROA 100. Based on this user input data, the ROA 100 can determine the number of FTEs that should be allocated for the service. The window 500 of FIG. 5, as will also be described in further detail below, includes a number of fields that display the number of FTEs that should be allocated to the service as determined by the ROA 100, as well as intermediate results data and other portions of the data model that are used by the ROA 100 for determining the number of FTES that should be allocated for the service.

The window 400 of FIG. 4 includes a Service Provider Attributes area 402, a Forecasted Task Change Percentage area 404, a Goals area 406, and a Run button 408. The Service Provider Attributes area 402 is editable based on user input, and can receive information that describes the service provider. As shown in FIG. 4, this information may include the number of workdays per year per FTE, an efficiency factor (which indicates, for each work hour allocated for an FTE, the effective amount of work that is actually performed), a parameter that indicates the number of annual productive hours per FTE, and an AHT for the tasks handled by the service provider for this service. Also as shown in the Service Provider Attributes area 402, the ROA 100 may determine other parameters related to the service provider based on the above-mentioned parameters, such as parameters that indicate a number of productive hours per FTE per day and the task capacity per FTE per day. The Forecasted Task Change Percentage area 404 and the Goals area 406 are also editable based on user input. The Forecasted Task Change Percentage area 404 can receive user input that indicates an adjustment factor (as described above with reference to FIGS. 1-3), while the Goals area 406 can receive user input that describes two goals (the goals having attributes such as those possessed by the goals described above with reference to FIGS. 1-3).

In response to a selection of the Run button 408, the ROA 100 performs the method 200 of FIG. 2 (which may include the method 300 of FIG. 3), using the information indicated in the Service Provider Attributes area 402, Forecasted Task Change Percentage area 404, and Goals area 406 as input data.

Although not shown in FIG. 4, the window 400 of FIG. 4 may also include one or more other fields or user interface elements that may be used to specify a date range for historical task information to use as input data to the ROA 100. In an instance where the window 400 of FIG. 4 includes such fields or other user interface elements, when the Run button 408 is selected, ROA 100 may obtain the specified historical task information from the service statistics database 122 and use the specified historical task information in determining the FTEs that should be allocated to the service.

After determining the FTEs that should be allocated to the service, ROA 100 displays the window 500 of FIG. 5. The window 500 of FIG. 5 includes a Final Results area 502, an Intermediate Results area 504, and a Daily Simulation Area 506. The Final Results area 502 includes the number of FTEs determined by the ROA 100 as necessary for the service provider to perform the service. The Intermediate Results area 504 includes intermediate parameters that are used to determine the final number of FTEs, such as parameters that are determined in steps 204 and 206 of FIG. 2 and step 304 of FIG. 3. The Daily Simulation Area 506 includes additional intermediate parameters used by the ROA 100 for determining the final number of FTEs, such as parameters that are used in step 304 of FIG. 3.

Although FIGS. 4-5 show two windows 400, 500 that may be included in the graphical user interface of the ROA 100, these windows 400, 500 are provided purely by way of example, and any type of graphical user interface may be included in the ROA 100. As one example of a variation on the two windows 400, 500 shown in FIGS. 4-5, the elements shown in these two windows 400, 500 may be included in a single window.

In FIG. 4, a number of the example parameters that are shown in the Service Provider Attributes area 402, Forecasted Task Change Percentage area 404, and Goals area 406 are shown as round and/or whole numbers—for example, the number of workdays per year, average handling time, percentage of tasks done for Goal One, and TAT for Goal One are shown as having values of 250, 5.00, 90%, and 1, respectively. These values are provided only by way of example, and each or any of the parameters shown in FIG. 4 (and/or any other parameters used by the ROA 100) may be non-round or fractional numbers, and/or may include a large number of decimal digits. For example, example parameter values such as 233.555 workdays per year, 4.3734 minutes of average handling time, 86.9909% of tasks done for Goal One, and 0.75 days TAT for Goal One would also be acceptable values for use by the ROA 100. Similarly, the parameters shown in FIG. 5 (and/or any other parameters used by the ROA 100) may be non-round or fractional numbers, and/or may include a large number of decimal digits. For example, while FIG. 5 shows an example result that indicates that 21.01 FTEs are necessary for the service provider to perform the service, the ROA 100 may determine this value out to the ten thousandths place, or beyond.

Figure 6:
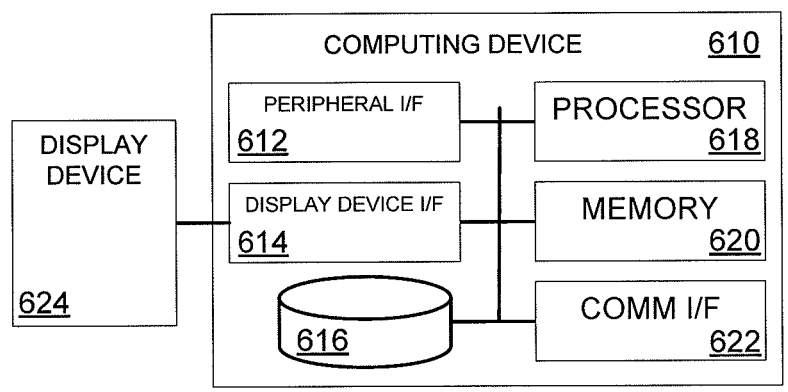
FIG. 6 shows a computing device that may be used to implement the features described herein.

FIG. 6 shows an example computing device 610 that may be used to implement features describe above with reference to FIGS. 1-5. The computing device 610 includes a processor 618, memory device 620, communication interface 622, peripheral device interface 612, display device interface 614, and data storage device 616. FIG. 6 also shows a display device 624, which may be coupled to or included within the computing device 610.

The memory device 620 may be or include a device such as a Dynamic Random Access Memory (D-RAM), Static RAM (S-RAM), or other RAM or a flash memory. The data storage device 616 may be or include a hard disk, a magneto-optical medium, an optical medium such as a CD-ROM, a digital versatile disk (DVDs), or Blu-Ray disc (BD), or other type of device for electronic data storage.

The communication interface 622 may be, for example, a communications port, a wired transceiver, a wireless transceiver, and/or a network card. The communication interface 622 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 612 is configured to communicate with one or more peripheral devices. The peripheral device interface 612 operates using a technology such as Universal Serial Bus (USB), PS/2, Bluetooth, infrared, serial port, parallel port, and/or other appropriate technology. The peripheral device interface 612 may, for example, receive input data from an input device such as a keyboard, a mouse, a trackball, a touch screen, a touch pad, a stylus pad, and/or other device. Alternatively or additionally, the peripheral device interface 612 may communicate output data to a printer that is attached to the computing device 610 via the peripheral device interface 612.

The display device interface 614 may be an interface configured to communicate data to display device 624. The display device 624 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 614 may operate using technology such as Video Graphics Array (VGA), Super VGA (S-VGA), Digital Visual Interface (DVI), High-Definition Multimedia Interface (HDMI), or other appropriate technology. The display device interface 614 may communicate display data from the processor 618 to the display device 624 for display by the display device 624. As shown in FIG. 6, the display device 624 may be external to the computing device 610, and coupled to the computing device 610 via the display device interface 614. Alternatively, the display device 624 may be included in the computing device 600.

An instance of the computing device 610 of FIG. 6 may be configured to perform any feature or any combination of features described above as performed by the client device 110. Alternatively or additionally, the memory device 620 and/or the data storage device 616 may store instructions which, when executed by the processor 618, cause the processor 618 to perform any feature or any combination of features described above as performed by the ROA 100. Alternatively or additionally, each or any of the features described above as performed by the ROA 100 may be performed by the processor 618 in conjunction with the memory device 620, communication interface 622, peripheral device interface 612, display device interface 614, and/or storage device 616.

Figure 7:
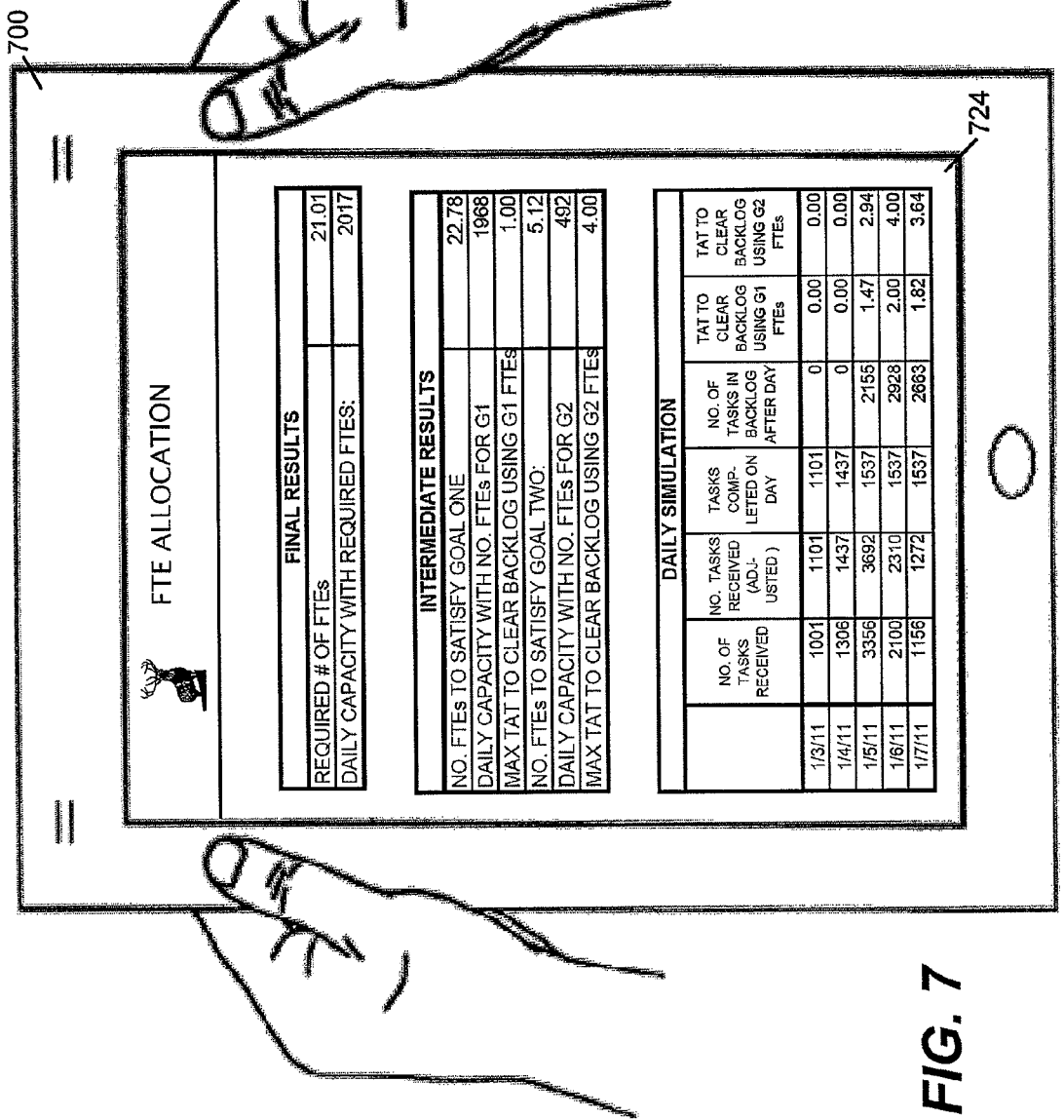
FIG. 7 shows a tablet computer that is a more specific example of the computing device of FIG. 6.

FIG. 7 shows a tablet computer 710 that is a more specific example of the computing device 610 of FIG. 6. The tablet computer 710 may include a processor (not depicted), memory device (not depicted), communication interface (not depicted), peripheral device interface (not depicted), display device interface (not depicted), storage device (not depicted), and touch screen display 724, which may possess characteristics of the processor 618, memory device 620, communication interface 622, peripheral device interface 612, display device interface 614, storage device 616, and display device 624, respectively, as described above with reference to FIG. 6. The touch screen display 724 may receive user input using technology such as, for example, resistive sensing technology, capacitive sensing technology, optical sensing technology, or any other appropriate touch-sensing technology.

Although examples are provided above with reference to FIGS. 1-7 wherein the ROA 100 is controlled by the insurance company, the features described above may also be used, mutatis mutandis, in situations where the service provider uses the ROA 100 to determine the number of FTEs that the service provider should engage for providing a service Although examples are provided above with reference to FIGS. 1-7 wherein exactly two SLAs or goals are used, the features described above are also applicable, mutatis mutandis, to scenarios where any number of SLAs or goals (e.g., three, four, five, six, or more SLAs or goals) are used.

Although examples are provided above that relate to an insurance company and a service provider that provides services to the insurance company, the features described above with reference to FIGS. 1-7 are also applicable and/or may be used by, mutatis mutandis, any type of business, any type of non-business organization, and/or any individual.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although the methods and features are described above with reference to the example architecture 102 of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-7 may be used alone without the other features and elements or in various combinations with or without other features and elements. Sub-elements and/or sub-steps of the methods described above with reference to FIGS. 1-7 may be performed in any arbitrary order (including concurrently), in any combination or sub-combination.

What is claimed is:

1. A system for determining a number of full time equivalents (FTEs) required by a service provider for providing an insurance related service to an insurance company, wherein the insurance related service includes performance of repeatable insurance related tasks, the system comprising:
a memory device configured to store information that includes:
a first performance goal and a second performance goal, wherein
the first performance goal indicates a first turnaround time (TAT) within which a first percentage of insurance related tasks are to be completed, and
the second performance goal indicates a second TAT within which a second percentage of insurance related tasks are to be completed;
a processor configured:
to determine a minimum number of FTEs required to meet the first performance goal;
to determine a minimum number of FTEs required to meet the second performance goal; and
to determine a minimum number of FTEs required to meet the first and second performance goals, wherein the minimum number of FTEs required to meet the first and second performance goals is a weighted sum of the minimum number of FTEs required to meet the first performance goal and the minimum number of FTEs required to meet the second performance goal; and
a graphical user interface configured to display the minimum number of FTEs required to meet the first and second performance goals.

2. The system of claim 1, wherein the first performance goal is an expected level of service to the insurance company, and the second performance goal is an impacted level of service to the insurance company.

3. The system of claim 1, wherein the historical insurance related task data includes task volume and an adjustment factor based on predetermined expected task volume.

4. The system of claim 1, wherein the graphics user interface is configured to input the first performance goal, second performance goal, first TAT, and second TAT.

5. The system of claim 1, wherein the processor is configured to determine the minimum number of FTEs required to meet the first and second performance goals using the following formula:

$$\text{FINAL\_FTEs} = (G1\% \times G1\_\text{FTEs}) + ((1 - G1\%) \times G2\_\text{FTEs}),$$

wherein:
FINAL_FTEs is the minimum number of FTEs required to meet the first and second performance goals;

G1% is the first percentage of insurance related tasks;
G1_FTEs is the minimum number of FTEs required to meet the first performance goal; and
G2_FTEs is the minimum number of FTEs required to meet the second performance goal.

6. The system of claim 1 wherein the insurance related service includes assigning a claim number to a workers' compensation claim file.

7. The system of claim 1 wherein the insurance related service includes determining policy coverage for a personal lines insurance claim.

8. The system of claim 1 wherein the insurance related service includes transmitting correspondence to an injured worker associated with a workers' compensation claim.

9. The system of claim 1, wherein:
the processor is further configured to generate a report that includes the minimum number of FTEs required to meet the first and second performance goals and to generate an email message that includes the report as an attachment; and
the system further comprises a communication interface configured to transmit the email message.

10. A computer-implemented method for determining a number of full time equivalents (FTEs) required by a service provider for providing a service to an insurance company, wherein the service includes the performance of repeatable business tasks, the method comprising:
storing, in a memory device, information that includes a first performance goal and a second performance goal, wherein
the first performance goal indicates a first turnaround time (TAT) within which a first percentage of tasks are to be completed and is an expected level of service to the insurance company, and
the second performance goal indicates a second TAT within which a second percentage of tasks are to be completed and is an impacted level of service to the insurance company;
determining, by a processor, a minimum number of FTEs required to meet the first performance goal;
determining, by the processor, a minimum number of FTEs required to meet the second performance goal; and
determining, by the processor, a minimum number of FTEs required to meet the first and second performance goals, wherein the minimum number of FTEs required to meet the first and second performance goals is a weighted sum of the minimum number of FTEs required to meet the first performance goal and the minimum number of FTEs required to meet the second performance goal; and
displaying, at a graphical user interface, the minimum number of FTEs required to meet the first and second performance goals.

11. The computer-implemented method of claim 10, wherein the processor determining the minimum number of FTEs required to meet the first and second performance goals includes using the following formula:

FINAL_FTEs=(G1%×G1_FTEs)+((1−G1%)× G2_FTEs), wherein:
FINAL_FTEs is the minimum number of FTEs required to meet the first and second performance goals;
G1% is the first percentage of tasks;
G1_FTEs is the minimum number of FTEs required to meet the first performance goal; and
G2_FTEs is the minimum number of FTEs required to meet the second performance goal.

12. The computer-implemented method of claim 10, wherein:
the determining a minimum number of FTEs required to meet the first performance goal is responsive to historical insurance related task data including task volume and an adjustment factor based on predetermined expected task volume, and
the determining a minimum number of FTEs required to meet the second performance goal is responsive to historical insurance related task data including task volume and an adjustment factor based on predetermined expected task volume.

13. The computer-implemented method of claim 10, wherein the graphical user interface configured to input the first performance goal, second performance goal, first TAT, and second TAT.

14. The computer-implemented method of claim 10, further comprising:
the memory device storing historical task data that indicates, for each of a plurality of workdays within a time period, a number of tasks that were assigned to the service provider; and
wherein the processor determining the minimum number of FTEs required to meet the first performance goal is based on the historical task data.

15. The computer-implemented method of claim 10, wherein the service includes:
assigning a claim number to a workers' compensation claim file;
determining policy coverage for a personal lines insurance claim; or
transmitting correspondence to an injured worker associated with a workers' compensation claim.

16. A non-transitory computer-readable storage medium having processor-executable instructions stored thereon which, when executed by at least one processor, will cause the at least one processor to perform a method for determining a number of full time equivalents (FTEs) required by a service provider for providing a service to a business, wherein the service includes the performance of repeatable business tasks, the method comprising:
obtaining information that includes a first performance goal and a second performance goal, wherein
the first performance goal indicates a first turnaround time (TAT) within which a first percentage of tasks are to be completed and is an expected level of service to the business, and
the second performance goal indicates a second TAT within which a second percentage of tasks are to be completed and is an impacted level of service to the business;
determining a minimum number of FTEs required to meet the first and second performance goals, wherein the minimum number of FTEs required to meet the first and second performance goals is a weighted sum of:
a minimum number of FTEs required to meet the first performance goal; and
a minimum number of FTEs required to meet the second performance goal; and
transmitting, via a graphical user interface, information that includes the minimum number of FTEs required to meet the first and second performance goals.

17. The non-transitory computer-readable storage medium of claim 16, wherein the determining the minimum number of FTEs required to meet the first and second performance goals includes using the following formula:

$$\text{FINAL\_FTEs} = (G1\% \times G1\_FTEs) + ((1-G1\%) \times G2\_FTEs),$$

wherein:
- FINAL_FTEs is the minimum number of FTEs required to meet the first and second performance goals;
- G1% is the first percentage of tasks;
- G1_FTEs is the minimum number of FTEs required to meet the first performance goal; and
- G2_FTEs is the minimum number of FTEs required to meet the second performance goal.

18. The non-transitory computer-readable storage medium of claim 16, wherein the method further comprises:
- determining the minimum number of FTEs required to meet the first performance goal; and
- determining the minimum number of FTEs required to meet the second performance goal.

19. The non-transitory computer-readable storage medium of claim 18, wherein the determining a minimum number of FTEs required to meet the first performance goal is responsive to historical insurance related task data including task volume and an adjustment factor based on predetermined expected task volume, and
- the determining a minimum number of FTEs required to meet the second performance goal is responsive to historical insurance related task data including task volume and an adjustment factor based on predetermined expected task volume.

20. The non-transitory computer-readable storage medium of claim 16 wherein the service includes:
- assigning a claim number to a workers' compensation claim file;
- transmitting correspondence to an injured worker associated with a workers' compensation claim; or
- determining policy coverage for a personal lines insurance claim.

* * * * *